Sept. 15, 1953   J. H. BOOTH ET AL   2,652,265
STEERING KNUCKLE
Filed April 6, 1951
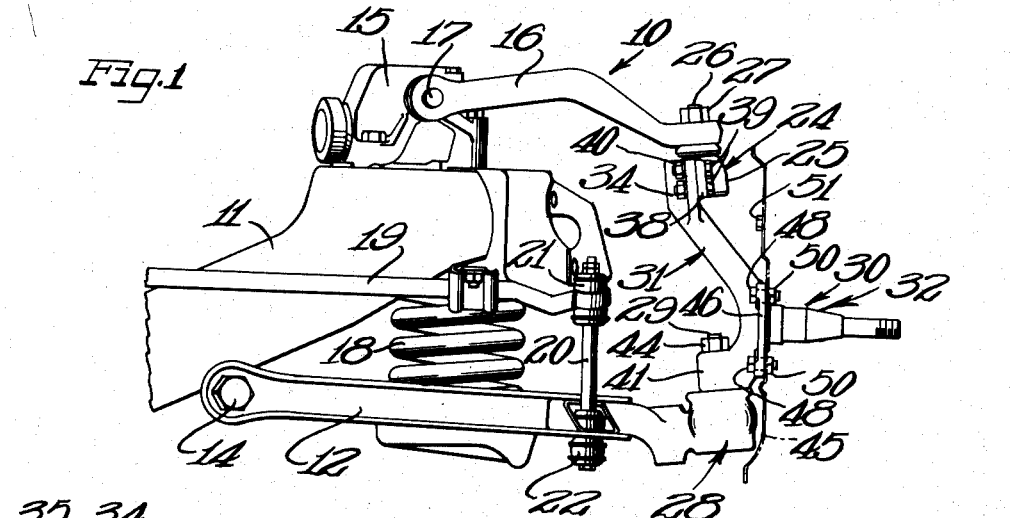
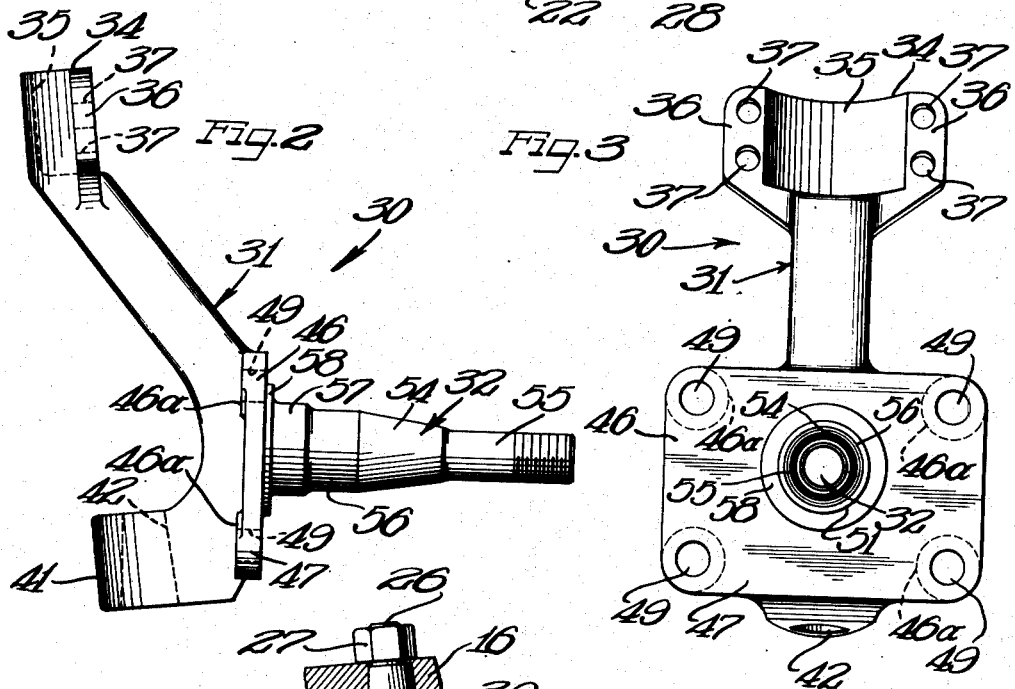
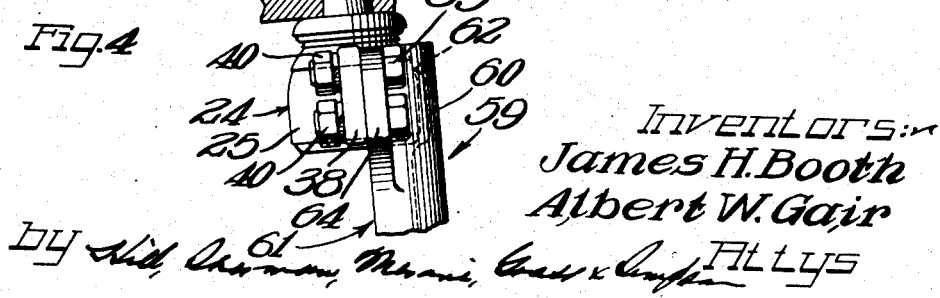
Inventors:
James H. Booth
Albert W. Gair
by [signature] Attys Patented Sept. 15, 1953

2,652,265

UNITED STATES PATENT OFFICE 2,652,265

STEERING KNUCKLE

James H. Booth, Venice Township, Shiawassee County, and Albert W. Gair, Fraser, Mich., assignors to Thompson Products, Inc., Cleveland, Ohio, a corporation of Ohio Application April 6, 1951, Serial No. 219,746

3 Claims. (Cl. 280—96.2)

This invention relates to an improved steering knuckle construction for use in an independent steerable wheel suspension in a vehicle. More specifically, the invention relates to an improved and easily manufactured steering knuckle with a spindle support portion having means at the upper and lower ends thereof for attaching to the control arm of an independent wheel suspension and an integral wheel support spindle.

In an automotive type independent steerable wheel suspension, it is important to provide a strong, durable steering knuckle of simplified construction so that the cost of fabrication may be kept to a minimum. Furthermore, it is important that all portions of the wheel suspension system be readily accessible for replacement or repair in order to cut down on the time required for assembly or disassembly.

According to the present invention, an independent steerable wheel suspension, including upper and lower control arms pivotally mounted on an automobile frame and ball joints provided at the outer ends of the control arm, has the spindle support portion of the steering knuckle connected to the ball joints for pivoting and tilting relative to the control arms. The stud of the upper ball joint is fixedly connected to the upper control arm in the conventional manner, and the ball joint housing is provided with a pair of attachment flanges or ears which are fixedly secured to mating flanges or ears formed on an attachment portion or socket at the upper end of the steering knuckle spindle support portion. The housing of the lower ball joint is fixedly secured to the outer end of the lower control arm, and the lower joint stud has a tapered portion fixedly received in a mating tapered hole formed in an integral attachment boss at the lower end of the spindle support portion. An integral attachment pad is formed on the steering knuckle and has an outward face roughly parallel to the pivot axis of the knuckle. An integral wheel support spindle is formed outwardly at right angles to the attachment pad face and is provided with a tapered portion and a reduced diameter threaded end portion. A brake backing plate is fixedly secured against the outward face of the attachment pad by pin means such as bolts inserted through aligned bolt holes or apertures formed through the attachment pad and the brake backing plate. The upper portion of the spindle support is slanted inwardly at a substantial angle to provide ready access to the face of the brake backing plate opposing the spindle support in order to permit easy removal or insertion of bolts or screws which are used for adjusting or attaching parts of the brake mechanism.

It is, therefore, an object of the present invention to provide an improved steering knuckle for use in an independent wheel suspension.

Another object of the invention is to provide a simplified one-piece steering knuckle construction including a spindle support portion and an integral wheel support spindle.

A further object of the invention is to provide improved means attaching the housing of a ball joint to one end of the spindle support portion of a steering knuckle in an independent wheel suspension.

Still another object of the present invention is to provide a simplified and improved steering knuckle for use in an independent steerable wheel suspension including a spindle support portion having means at each end thereof for pivotally attaching the steering knuckle to the control arms of the wheel suspension and including an integral wheel support spindle and an integral attachment pad for securing a brake backing plate thereto.

A still further object of the invention is to provide an improved steering knuckle designed for inexpensive mass production and for expeditious assembly in an independent wheel suspension.

Other objects, features and advantages of the present invention will be apparent from the following detailed description of two embodiments, by way of preferred examples only, taken in conjunction with the accompanying drawings.

On the drawings:

Figure 1 is a fragmentary front elevational view of an independent steerable wheel suspension including a steering knuckle according to the present invention;

Figure 2 is an enlarged front elevational view of the steering knuckle shown in Figure 1;

Figure 3 is an outside elevational view of the steering knuckle shown in Figure 2;

Figure 4 is an enlarged fragmentary, partially sectional, view of the upper ball joint attachment portion of a modified steering knuckle with the upper ball joint attached thereto.

As shown on the drawings:

In Figure 1 is shown an independent steerable wheel suspension 10 of an automobile or the like including a cross frame member 11 and a lower control arm or load carrying arm 12 pivotally attached at its inner end portion to the frame member 11 by means of an attachment bolt 14. A shock absorber 15 is fixedly mounted on the upper side of the end portion of the cross frame member 11 and has an upper control arm 16 pivotally and operatively attached at its inner end portion to the shock absorber 15 at 17. A coil support spring 18 is operatively disposed between the lower control arm 12, outwardly of the bolt 14, and the cross frame member 11 to resiliently transmit the weight of the automobile (not shown) from the frame member to the load carrying arm 12 for transmitting the load to a wheel (not shown). A torsion rod 19 is connected at one end portion to the lower control arm 12 outwardly of the spring 18 by means of a link 20 and associated attachment means 21 and 22.

A ball joint 24, of the controlled friction shimmy dampening type, has a casing 25 with a joint stud 26 tiltably and rotatably retained therein. The free end portion of the stud 26 is provided with a tapered section (not shown) fixedly received in a mating tapered hole (not shown) formed in the outer end portion of the upper control arm 16. A nut 27 is threadedly inserted over the end of the stud 26 to retain the same in fixed relation relative to the upper control arm.

An anti-friction load carrying ball joint 28 has its casing fixedly secured at the outer end portion of the lower control arm 12 and has a stud 29 tiltably and rotatably retained in the ball joint with an attachment portion extending upwardly therefrom. The studs 26 and 29 are in axial alignment.

According to the present invention, a steering knuckle 30 comprises generally a spindle support portion 31 and an integral wheel support spindle 32. The spindle support 31 has an integral attachment portion or socket 34 at the upper end thereof having a cavity 35 and a pair of transversely formed integral flanges or ears 36, 36, each of the ears having two bolt apertures 37 therethrough.

A portion of the ball joint casing 25 is received in substantially conforming spaced relation in the cavity 35, and a pair of integral ball joint attachment ears or flanges 38 are abutted against the outward faces of the ears 36. The upper ball joint 24 is held in fixed relation to the attachment socket 34 by means of bolts 39, inserted through the apertures 37 and aligned apertures (not shown) in the attachment flanges 38, and nuts 40. Thus, the ball joint tiltably and pivotally connects the upper end of the spindle support portion relative to the upper control arm in a simple, yet positive manner.

In order to pivotally attach the lower control arm to the lower end of the spindle portion 31 an integral lower attachment boss 41 is formed thereon and extends inwardly. A longitudinal tapered stud attachment hole 42 is formed in the boss 41 and is adapted to receive a mating tapered portion (not shown) formed on the lower joint 28 with the stud 29 retained therein by means of a nut 44. The spindle support portion 31 is so formed that the studs 26 and 29 are coaxial when assembled in the wheel suspension as shown in Figure 1.

For fixedly attaching a brake backing plate 45 to the steering knuckle 30, an integral attachment pad 46 is formed on the spindle support portion 31 close to the lower boss 41 and on the opposite side of the spindle support therefrom. An outside face 47 abuts the central portion of the brake backing plate 45, and the backing plate is held in this position by four bolts 48 inserted through four bolt holes or apertures 49 formed through the attachment pad 46 and aligned bolt apertures (not shown) in the backing plate. The bolts 48 are secured in the bolt apertures by means of nuts 50. Integral upstanding annular embossments 46a are provided on the inward face of the attachment pad 46 about the bolt apertures 49.

Referring to Figure 1, it will be noted that the upper portion of the spindle support 31 is slanted inwardly at a substantial angle relative to the attachment pad 46 and the brake backing plate 45 so that a fairly large clearance space is provided between the spindle support and the opposing face of the brake backing plate. Hence, ready access may be had to an attachment or adjustment bolt or screw such as a brake mechanism bolt 51.

For rotatably attaching a wheel (not shown) to the steering knuckle 30, the integral spindle 32 is formed outwardly from the spindle support portion 31 at right angles to the outward face 47 of the attachment pad 46. The spindle 32 has a tapered shank portion 54 and a reduced diameter externally threaded end portion 55 for receiving a wheel attachment nut (not shown). Inwardly of the tapered portion 54 is a cylindrical shank portion 56, succeeded inwardly by an increased diameter cylindrical shank portion 57. A circular embossment 58 is provided between the shank portion 57 and the face 47 of the attachment pad 46.

In Figure 4 is shown a modified embodiment of the invention. Herein a steering knuckle 59 is formed similarly to the steering knuckle 30 except for a modified attachment socket 60 provided at its upper end. The attachment socket 60 includes a cavity 62 formed oppositely from the cavity 35 of the steering knuckle 30. A pair of integral ears 64, 64 are included in the attachment socket 34 and have inwardly facing surfaces abutting the outwardly facing surfaces of the ball joint flanges 38 with the outwardly facing portion of the casing 25 received in the recess 62. It will be noted that this modified form may be utilized in applications where interference between parts of the wheel suspension would prevent use of the steering knuckle 30.

From the above description, it will be readily understood that the present invention provides an improved and simplified steering knuckle for use in an independent steerable wheel suspension for a vehicle or the like. The steering knuckle is of unitary construction and formed with advantageous ball joint connection means contributing both to the positiveness of connection and the simplicity of the parts. Simple but effective integral means are provided for connecting the steering knuckle to the brake backing plate. The overall design of the steering knuckle makes for expeditious assembly and disassembly in connection with the control arms, the brake structure and the wheel structure.

It will be understood that modifications and variations may be effected without departing from the scope of the novel concepts of the present invention.

We claim as our invention:

1. A steering knuckle for supporting a wheel and braking mechanism including a brake backing plate, said steering knuckle comprising a spindle support portion having an attachment socket at the upper end thereof, said attachment socket including a pair of spaced integral ears and an intermediate semi-cylindrical cavity, means for securing said ears to complementary ears of a ball joint housing with a portion of said ball joint housing disposed in said cavity, an integral attachment pad having an outer face roughly parallel to the pivot axis of the steering knuckle, said brake backing plate abutting said attachment pad outer face, and said spindle support portion between said pad and said attachment socket slanting upwardly and inwardly at a substantial angle from the vertical to provide an access space between the spindle support portion and said brake backing plate.

2. A steering knuckle comprising a spindle support portion having a semi-cylindrical, laterally open attachment socket at the upper end thereof for fixed attachment to the housing of a ball joint, said ball joint housing comprising a cylinder having upstanding ears thereon, said socket providing for the attachment of said ball joint housing thereto by means of said ears, such that the axis of said cylinder and its attachment ears are in alignment with the axis about which said spindle portion rotates, and means at the lower end of said spindle support portion for attachment to a second ball joint.

3. A steering knuckle comprising a spindle support portion adapted for rotation about a substantially vertical axis, a laterally open cavity at one end thereof for the accommodation of the housing of a ball joint, said ball joint housing having a pair of attachment ears extending laterally therefrom, attachment means on said spindle support adjacent the edge of said laterally open cavity for cooperation with the ears on said housing to fixedly secure said housing to said spindle support with a portion of said housing extending into said lateral cavity, whereby said housing with the ball joint therein may be completely removed from the spindle support by lateral movement of said housing relative to said spindle support.

JAMES H. BOOTH.
ALBERT W. GAIR.

References Cited in the file of this patent

UNITED STATES PATENTS

| Number | Name | Date |
|---|---|---|
| 1,298,234 | Lowther | Mar. 25, 1919 |
| 1,991,777 | Vaughn | Feb. 19, 1935 |
| 2,173,973 | Leighton | Sept. 26, 1939 |
| 2,226,406 | Krotz | Dec. 24, 1940 |
| 2,290,923 | Wahlberg | July 28, 1942 |
| 2,297,901 | Leighton | Oct. 6, 1942 |
| 2,521,335 | Booth | Sept. 5, 1950 |
| 2,544,331 | Kogstrom | Mar. 6, 1951 |
| 2,556,767 | McCann | June 12, 1951 |
| 2,567,530 | Schule | Sept. 11, 1951 |

FOREIGN PATENTS

| Number | Country | Date |
|---|---|---|
| 645,627 | Great Britain | Nov. 1, 1950 |
| 719,047 | Germany | Mar. 27, 1942 |